US00RE41056E

(19) United States
(12) Reissued Patent
Sidwell

(10) Patent Number: US RE41,056 E
(45) Date of Reissued Patent: Dec. 29, 2009

(54) BALLOON AND ROD CONNECTOR COMBINED WITH THE ROD

(76) Inventor: Paul E. Sidwell, 25414 NW. County Rd. 241, Alachua, FL (US) 32615

(21) Appl. No.: 29/286,205
(22) Filed: Apr. 27, 2007

Related U.S. Patent Documents

Reissue of:
(64) Patent No.: Des. 529,102
Issued: Sep. 26, 2006
Appl. No.: 29/228,733
Filed: Apr. 28, 2005

(51) LOC (9) Cl. ..... 21-01
(52) U.S. Cl. ..... D21/453; D20/43
(58) Field of Classification Search ..... D21/438–440, D21/453, 454; D11/117–130, 146, 164; D8/373, D8/382, 383, 394, 395, 396; D20/42, 43; 446/220–226; 40/212, 214, 591, 592, 606.01, 40/606.03, 606.11, 606.12, 607.1, 607.11; 428/7–9, 12, 23, 27, 31; 24/30.5, 543, 545, 24/555, 570; 211/13.1, 60.1, 89.01; 116/28 R, 116/30, 210, DIG. 8, DIG. 9
See application file for complete search history.

(56) References Cited

U.S. PATENT DOCUMENTS

| | | | | | |
|---|---|---|---|---|---|
| 2,882,645 | A | * | 4/1959 | Stivers | 446/220 |
| 3,267,604 | A | * | 8/1966 | Goldsmith | 446/222 |
| 4,661,081 | A | * | 4/1987 | Basseches | 446/220 |
| 4,715,841 | A | * | 12/1987 | Nelson et al. | 446/222 |
| 4,729,749 | A | * | 3/1988 | Milne | 446/222 |
| 4,737,133 | A | * | 4/1988 | Neumeier | 446/397 |
| 4,837,059 | A | * | 6/1989 | Milne | 428/12 |
| 4,879,823 | A | * | 11/1989 | Collins | 40/124.01 |
| 4,895,545 | A | * | 1/1990 | Nelson | 446/220 |
| 5,021,022 | A | * | 6/1991 | Ganz | 446/220 |
| D329,261 | S | * | 9/1992 | Pollack | D21/440 |
| 5,203,530 | A | * | 4/1993 | Liu | 248/309.1 |
| 5,295,891 | A | * | 3/1994 | Schalk | 446/222 |
| 5,395,276 | A | * | 3/1995 | Valentino | 446/217 |
| D360,844 | S | * | 8/1995 | Miller et al. | D10/110 |
| 5,444,607 | A | * | 8/1995 | Dreyfuss | 362/352 |
| 6,176,758 | B1 | * | 1/2001 | Wu | 446/224 |
| 6,375,534 | B1 | * | 4/2002 | Burns | 446/220 |
| 6,575,806 | B1 | * | 6/2003 | Nelson et al. | 446/222 |
| 6,969,295 | B1 | * | 11/2005 | Sidwell | 446/220 |

FOREIGN PATENT DOCUMENTS

| | | | |
|---|---|---|---|
| EP | 105179 | A1 * | 4/1984 |
| WO | WO 9105592 | A1 * | 5/1991 |

* cited by examiner

*Primary Examiner*—Catherine Tuttle
(74) *Attorney, Agent, or Firm*—Saliwanchik, Lloyd & Saliwanchik

(57) CLAIM

The ornamental design for a balloon and rod connector combined with the rod, as shown and described.

DESCRIPTION

*Notice: More than one reissue application has been filed for the reissue of Pat. No. D-529,102. The reissue applications are application Ser. Nos. 29/286,205 (the present application), and 29/322,997, which is a divisional of reissue of the present application.*

FIG. 1 is a perspective view showing my new design with the rod portion removed for a clear disclosure of the end configuration;
FIG. 2 is a reduced scale front elevational view thereof;
FIG. 3 is a rear elevational view thereof;
FIG. 4 is a left side elevational view thereof;
FIG. 5 is a right side elevational view thereof;
FIG. 6 is a top view thereof; *and,*
FIG. 7 is a bottom view thereof[; and,
FIG. 8 is an enlarged scale perspective view of the cross section along line 8—8 of FIG. 3].

1 Claim, 3 Drawing Sheets

(AMENDED)

Figure 2:
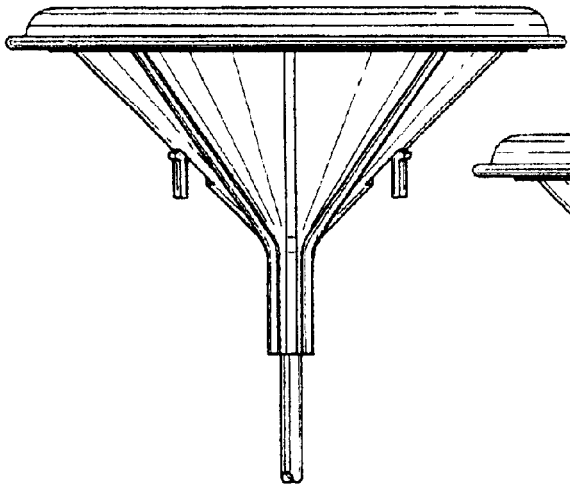
Figure 3:
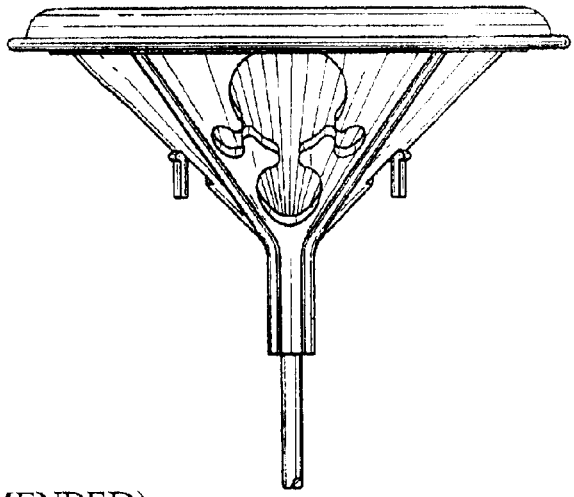
Figure 6:
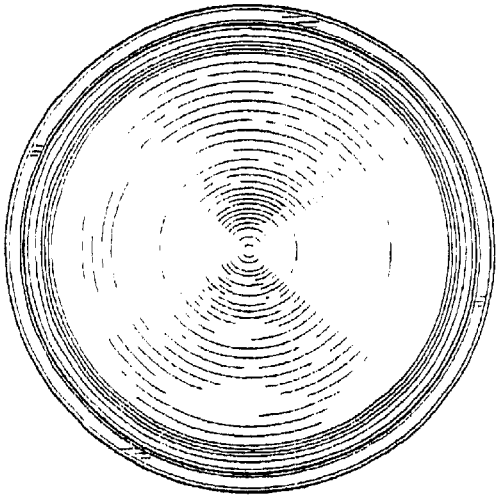
Figure 8:
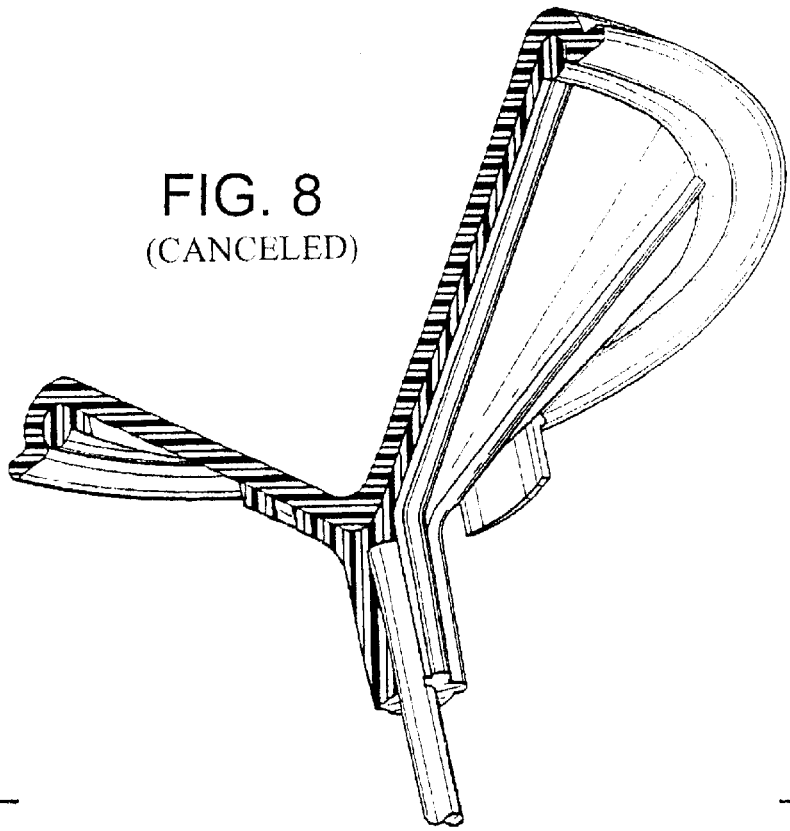

Matter enclosed in heavy brackets [ ] appears in the original patent, but forms no part of this reissue; matter printed in italics indicates the additions made by reissue.

FIG. 1 (AMENDED)
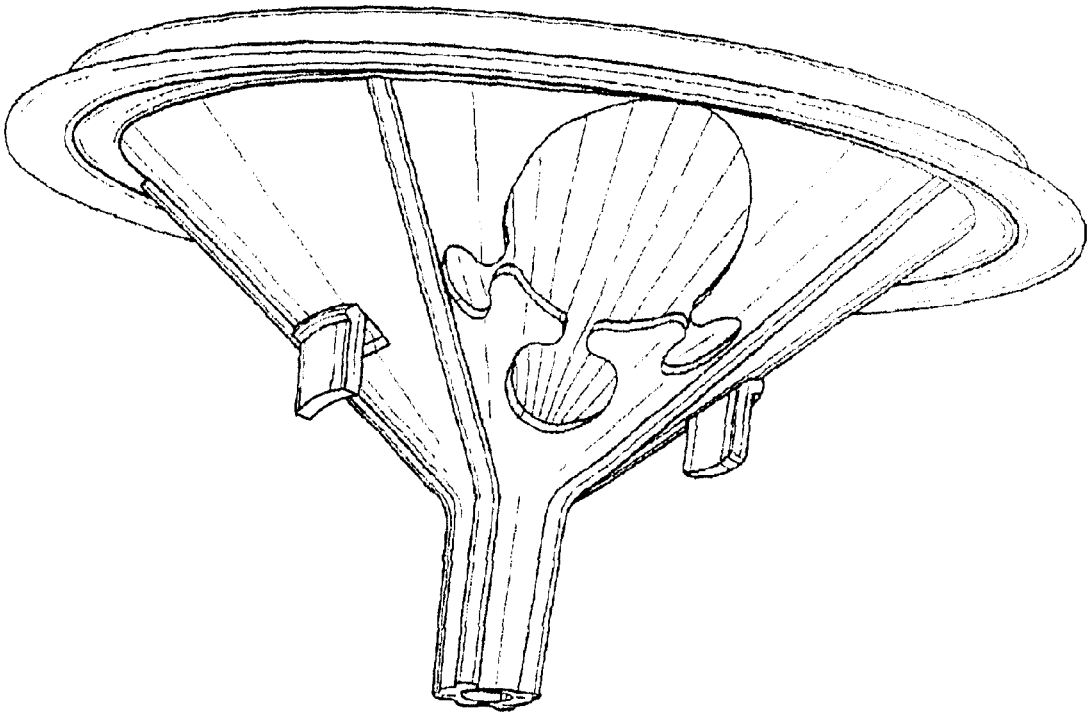

FIG. 4 (AMENDED)
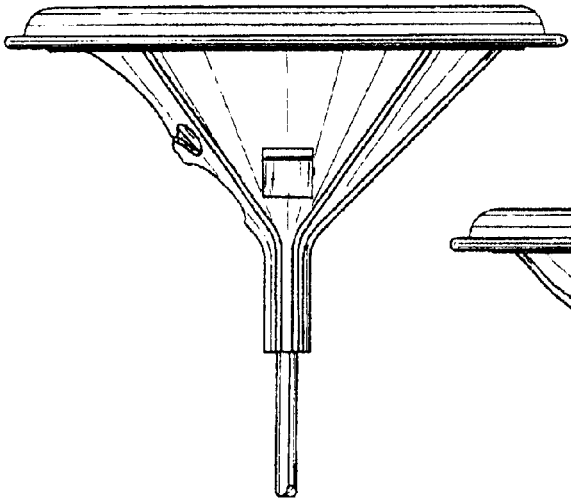
FIG. 5 (AMENDED)
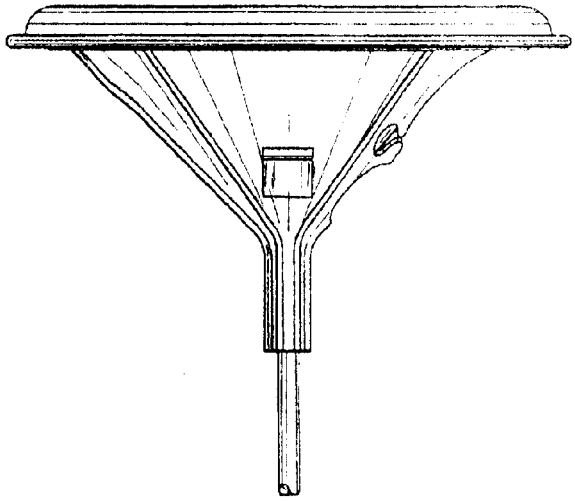

FIG. 7 (AMENDED)
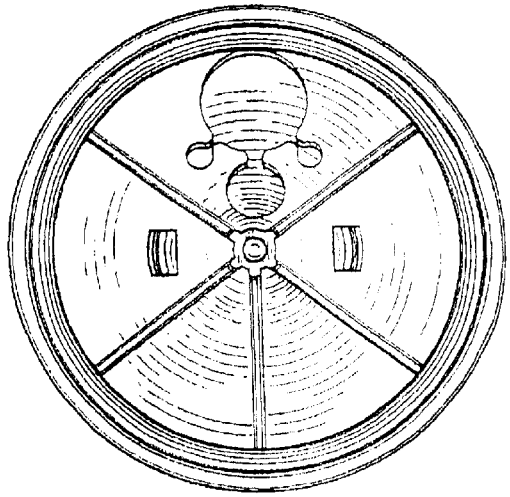
(CANCELED)